(12) United States Patent
Gilliam

(10) Patent No.: US 10,435,940 B2
(45) Date of Patent: Oct. 8, 2019

(54) WELDED STEEL DOOR

(71) Applicant: Steven K. Gilliam, Lexington, TN (US)

(72) Inventor: Steven K. Gilliam, Lexington, TN (US)

(73) Assignee: Republic Doors and Frames, McKenzie, TN (US)

( * ) Notice: Subject to any disclaimer, the term of this patent is extended or adjusted under 35 U.S.C. 154(b) by 173 days.

(21) Appl. No.: 14/483,449

(22) Filed: Sep. 11, 2014

(65) Prior Publication Data

US 2016/0076299 A1    Mar. 17, 2016

(51) Int. Cl.
*E06B 3/82* (2006.01)
*B23K 11/00* (2006.01)
*B23K 11/14* (2006.01)
B23K 31/02 (2006.01)
B23K 101/04 (2006.01)
B23K 101/18 (2006.01)
B23K 103/04 (2006.01)

(52) U.S. Cl.
CPC ............ *E06B 3/827* (2013.01); *B23K 11/002* (2013.01); *B23K 11/14* (2013.01); *B23K 2101/045* (2018.08); *B23K 2101/18* (2018.08); *B23K 2103/04* (2018.08)

(58) Field of Classification Search
CPC ......... B23K 11/002; B23K 31/02; E06B 3/82; E06B 3/822; E06B 3/827
USPC ..... 52/783.1, 784.1, 784.12, 784.13, 784.16, 52/792.1, 792.11, 795.1; 228/101; 219/117.1
See application file for complete search history.

(56) References Cited

U.S. PATENT DOCUMENTS 1,229,700 A * 6/1917 Auel ...................... B23K 11/14
219/92
1,901,176 A * 3/1933 Lawson ................ B23K 11/14
219/93
3,003,902 A * 10/1961 McDuff .................. E04C 2/292
29/463

(Continued)

FOREIGN PATENT DOCUMENTS

AT         381362 B  * 10/1986  ............. E06B 3/827
DE       3520500 A1  *  1/1986  ............. E04C 2/292

(Continued)

OTHER PUBLICATIONS

Mesker Catalog, "Mesker First!", 23 pages, 3-25, undated.
Mesker Brochure, "Welcome to Welded Door!", one page, published Apr. 18, 2013.

*Primary Examiner* — Patrick J Maestri
*Assistant Examiner* — Joseph J. Sadlon
(74) *Attorney, Agent, or Firm* — Fay Sharpe LLP

(57) ABSTRACT

A welded steel door including a pan having a bottom surface forming a first face of the door and flanges extending on opposite edges thereof forming opposite side edges of the door, the flanges having a lid engaging surface spaced from the bottom surface, a lid having a top surface forming a second face of the door opposite the first face, opposite edges of the top surface each having a hem mated with a respective lid engaging surface of each flange, the hem including a portion of the top surface folded back on itself, and a plurality of welds securing the lid to the pan. The welds extend between the portion of the top surface of the lid folded back on itself of each hem and the respective lid engaging surface of each flange and are thereby concealed.

12 Claims, 5 Drawing Sheets

(56) References Cited

U.S. PATENT DOCUMENTS

| | | | | |
|---|---|---|---|---|
| 3,252,262 A * | 5/1966 | Jessen | | E06B 3/827 |
| | | | | 52/784.14 |
| 3,604,155 A * | 9/1971 | Brown | | E06B 1/524 |
| | | | | 49/504 |
| 4,461,943 A * | 7/1984 | Beauvais | | F25D 23/063 |
| | | | | 219/86.9 |
| 5,121,593 A * | 6/1992 | Forslund | | B21D 51/32 |
| | | | | 52/404.1 |
| 5,283,413 A * | 2/1994 | Favre-Tissot | | B23K 11/18 |
| | | | | 219/118 |
| 5,285,609 A * | 2/1994 | Goad | | E04C 2/292 |
| | | | | 52/588.1 |
| 5,347,686 A * | 9/1994 | Tyler | | E05D 5/023 |
| | | | | 16/247 |
| 5,710,414 A * | 1/1998 | Matsen | | B21D 26/021 |
| | | | | 219/633 |
| 5,897,181 A * | 4/1999 | Avendano | | F25D 23/062 |
| | | | | 29/525.11 |
| 6,064,026 A * | 5/2000 | Tkazyik | | B23K 1/0004 |
| | | | | 219/56.21 |
| 6,141,930 A * | 11/2000 | Allwein | | E04B 1/767 |
| | | | | 52/404.1 |
| 6,351,882 B1 | 3/2002 | Weymer et al. | | |
| 6,580,030 B1 * | 6/2003 | Horne | | H02B 1/30 |
| | | | | 174/50 |
| 6,654,995 B1 * | 12/2003 | Wang | | B21D 39/04 |
| | | | | 219/93 |
| 6,694,702 B2 | 2/2004 | Weymer et al. | | |
| 7,048,175 B2 * | 5/2006 | Runyan | | B21D 26/055 |
| | | | | 228/112.1 |
| 7,315,009 B2 * | 1/2008 | Fujimoto | | B23K 9/0026 |
| | | | | 219/121.64 |
| 7,434,365 B2 | 10/2008 | Geller | | |
| 8,316,620 B2 | 11/2012 | Cotlet et al. | | |
| 8,333,049 B2 | 12/2012 | Badger | | |
| 8,341,920 B2 * | 1/2013 | Tavarez | | E06B 3/76 |
| | | | | 52/458 |
| 8,413,939 B2 * | 4/2013 | Ramsauer | | F16B 37/0878 |
| | | | | 248/214 |
| 8,530,782 B2 | 9/2013 | Komaki et al. | | |
| 9,095,924 B2 * | 8/2015 | Onose | | B23K 11/14 |
| 9,273,562 B2 * | 3/2016 | Bruck | | B23K 11/14 |
| 9,718,143 B2 * | 8/2017 | Pieterman | | B23K 11/14 |
| 2002/0104830 A1 * | 8/2002 | Gabbianelli | | B23K 11/002 |
| | | | | 219/117.1 |
| 2012/0183802 A1 * | 7/2012 | Bruck | | B23K 11/061 |
| | | | | 428/609 |

FOREIGN PATENT DOCUMENTS

| | | | | |
|---|---|---|---|---|
| GB | 1 479 983 | | 7/1977 | |
| GB | 2507966 A | * | 5/2014 | ............ F02B 63/044 |

* cited by examiner

WELDED STEEL DOOR

BACKGROUND

The present exemplary embodiment relates to metal doors. It finds particular application in conjunction with metal doors and methods for making the same that wherein a pan is joined with a lid, and will be described with particular reference thereto. However, it is to be appreciated that the present exemplary embodiment is also amenable to other like applications.

Commercial doors and frames of various styles have been widely available for many years. Such doors and frames generally include wood doors and frames, hollow metal doors and frames, and a wide variety hardware. The term "hollow metal" describes door and frame assemblies manufactured by forming sheet metal, normally in ranges from 20-14 gauge in doors and 18-12 gauge in frames. The end products are essentially hollow (versus their more-solid wood counterparts), hence the term. Hollow metal door designs generally follow one of two patterns for constructing the assembly shell—the perimeter-channel design and the pan-and-lid design.

Doors constructed according to the perimeter-channel design include front and back panels joined together in a seam along the center of the vertical door edges (e.g., hinge edge and lock edge). This design generally incorporates a perimeter framing of channels that are welded to the adjoining faces of the door assembly through weld projections in the channel components. The door assembly is strengthened by the frequent welds along the full perimeter of the door faces but at the cost to aesthetics with the visible exterior imperfections from the welding of projections through the interiors of panel faces. Besides the aesthetical objection of the weld marks, a significant manufacturing drawback of the perimeter-channel design is the absence of a "carrier" sub-assembly to facilitate progressive assembly. Tasks cannot easily be spread evenly to maintain a balanced flow. Bottlenecks frequently occur at the assembly step where an unbalanced amount of work converges. Accordingly, producing doors of the perimeter-channel design is more difficult.

The pan-and-lid design includes front and back panels that necessarily differ in size because they join together in a seam offset to a common side of the vertical door edges. This offsetting creates a "pan" with side edges that approach the full thickness of the finished assembly. The mating "lid" is relatively flat and configured to mate with the side edges of the pan.

Existing pan-and-lid door designs incorporate various mechanical engagements along the vertical edges of the door height. These mechanical methods include folding/seaming of panel edges or interlocking of tabs and slots in conjunction with adhesives. These methods have existed for several years.

One of the most beneficial features of the pan-and-lid design is that the pan sub-assembly provides a convenient "carrier" through the assembly processes. To this carrier, internal components can be attached or assembled with relatively open access in steps that can be separated and balanced into an even flow for productivity. Another significant benefit is the reduction in material costs through elimination of hinge and lock channels.

A critical element of the pan-and-lid designs is their dependency on adhesive to bond, strengthen and secure the mechanical interlocking. Inadequate or improper application of the adhesive compromises the assembly strength as the mechanical engagement could otherwise disengage. Immediately following assembly, the door is susceptible to twisting or racking from handling until the adhesive is set. In use, the adhesive is subject to fracture and failure from impacts such as uneven closing contact.

Accordingly, while pan-and-lid design doors are more easily mass-produced, they have heretofore suffered from the aforementioned shortcomings

BRIEF DESCRIPTION

The present disclosure sets forth a hollow door and method for making the same that has comparable strength and performance to welded perimeter-channel design doors yet can be manufactured in a streamlined process similar to a pan-and-lid design door.

In accordance with one aspect of the present disclosure, a welded steel door comprises a pan including a bottom surface forming a first face of the door and flanges extending on opposite edges thereof forming opposite side edges of the door, the flanges having a lid engaging surface spaced from the bottom surface, a lid having a top surface forming a second face of the door opposite the first face, opposite edges of the top surface each having a hem mated with a respective lid engaging surface of each flange, the hem including a portion of the top surface folded back on itself, and a plurality of welds securing the lid to the pan, the welds extending between the portion of the top surface of the lid folded back on itself of each hem and the respective lid engaging surface of each flange.

At least one of the flanges can be c-shape in cross-section. The lid engaging surface of at least one of the flanges can be generally parallel to the bottom surface of the pan. At least one of the hems can further comprise a downturned lip at a distal end of the portion of the top surface folded back on itself. A width of the hem and a width of the lid engaging surface can be coextensive, and the lip can engage an end face of the lid engaging surface, whereby the flange is restricted from inward rotation by the lip. The hem and the lid engaging surface can extend completely along a length of a major axis of the door. The welds can include projection spot welds. The projection spot welds can be formed from projections in the lid engaging surfaces of at least one of the flanges (the projections being present prior to welding operations). The door can further comprise a top and a bottom channel welded to the pan and lid that, together with the sides, enclose the interior of the door.

In accordance with another aspect, a method of making a welded steel door comprises providing a pan with a bottom surface and flanges extending on opposite edges of the bottom surface, each flange having a lid engaging surface spaced from the bottom surface and a plurality of weld projections, providing a lid with a top surface having hemmed opposite edges, positioning the lid on the pan such that each hem is facing a respective lid engaging surface of each flange, and welding the lid to the pan at the plurality of projection welds.

The welding can include resistance welding each edge of the door in a single process. The providing the lid can include forming the lid from a sheet stock. The forming the lid can include forming a downturned lip extending away from the top surface at a distal end of at least one of the hems. The positioning the lid on the pan can include positioning the lip to engage an end surface of the flange. The method can further include positioning an end channel in a top or bottom of the door between the pan and lid, and welding the end channel to the pan and lid. The projection welds can extend between a portion of the top surface of the lid folded back on itself forming each hem and the respective lid engaging surface of each flange.

DETAILED DESCRIPTION

Figure 2:
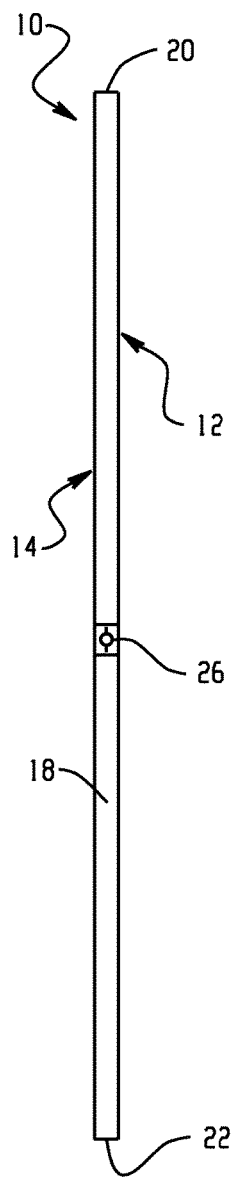
FIG. 2 is a first side view of the door of FIG. 1.
Figure 1:
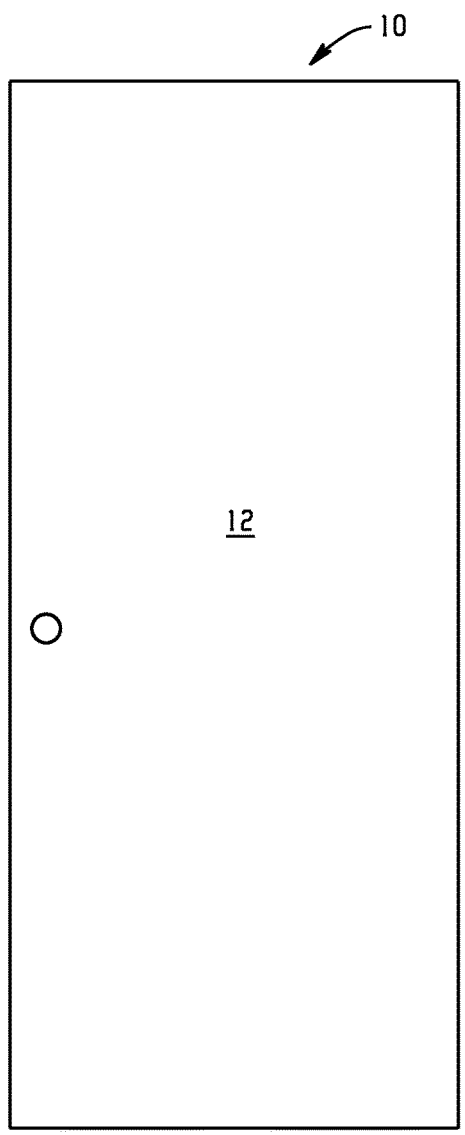
FIG. 1 is a plan view of an exemplary door in accordance with the present disclosure.
Figure 3:
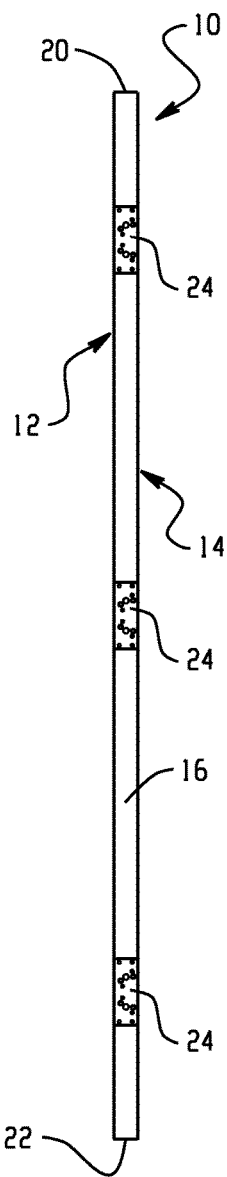
FIG. 3 is a second side view of the door of FIG. 1.
Figure 4:
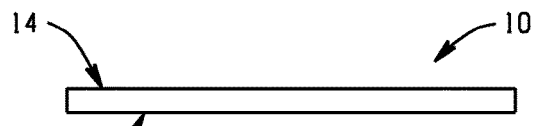
FIG. 4 is a top view of the door of FIG. 1.

With initial reference to FIGS. 1-4, a hollow metal door 10 in accordance with the present disclosure is illustrated. The door 10 generally comprises a front face 12, a back face 14, a hinge edge 16, a lock edge 18, and top and bottom edges 20 and 22. The hinge edge 16 includes three hinge tap plates 24 for securing hinges to the door for mounting the door in a conventional manner. The lock edge 18 includes a lock tap plate 26 for receiving conventional door knob assembly and related lock hardware for allowing opening, closing and locking of the door when mounted in a doorway. On the exterior surface, the illustrated door 10 of FIGS. 1-4 appears to be similar to other conventional hollow metal doors. However, it will become apparent in the description that follows that the door 10 includes a variety of features that provide, among other things, improved aesthetics, performance and manufacturing efficiencies as compared to such conventional doors.

Figure 5:
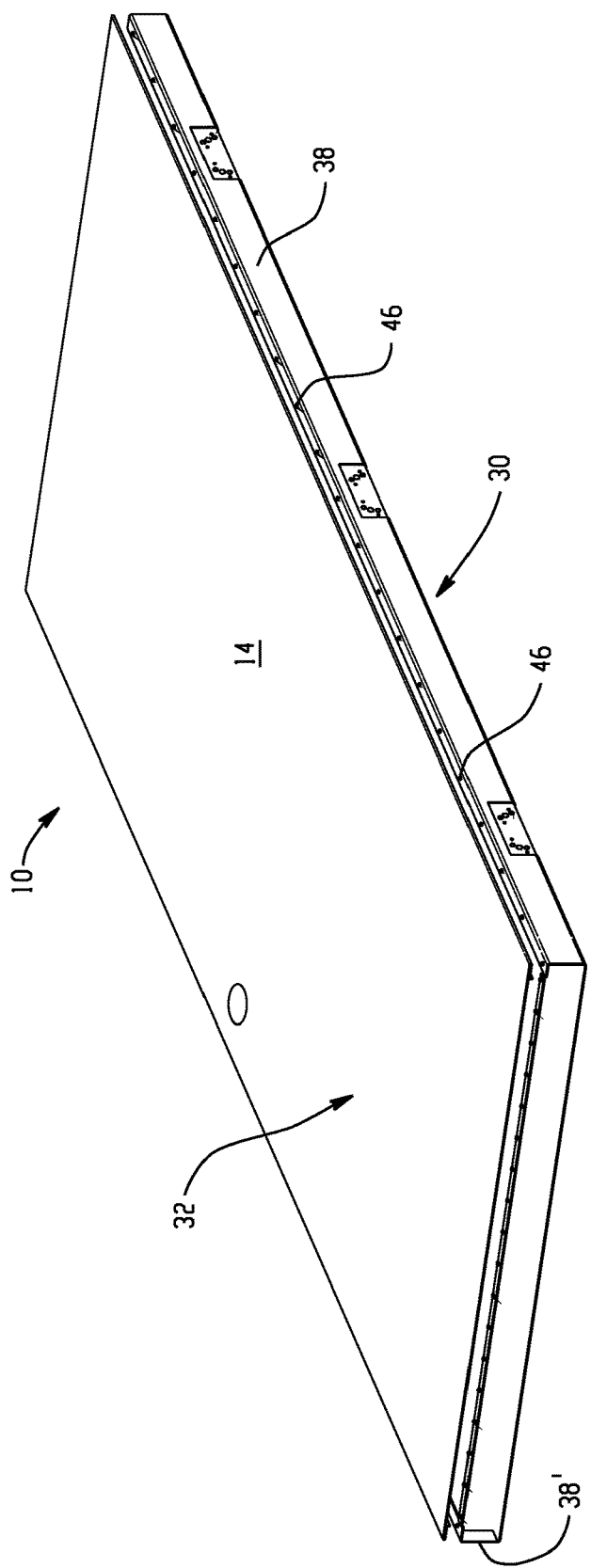
FIG. 5 is a perspective view of the door of FIG. 1 in a partially assembled state.

With reference to FIG. 5, the door 10 is illustrated in partially assembled state. The primary components of the door 10 are a pan 30 and a lid 32. The pan 30 has a bottom surface forming the front face 12 of the door 10, and flanges 38 and 38' extending on opposite edges thereof forming opposite side edges (hinge and lock edges 16 and 18) of the door 10. Each of the flanges 38 and 38' has a lid engaging surface 42 spaced from the bottom surface and generally parallel thereto. A plurality of projections 46 extend from the lid engaging surface 42.

Figure 6:
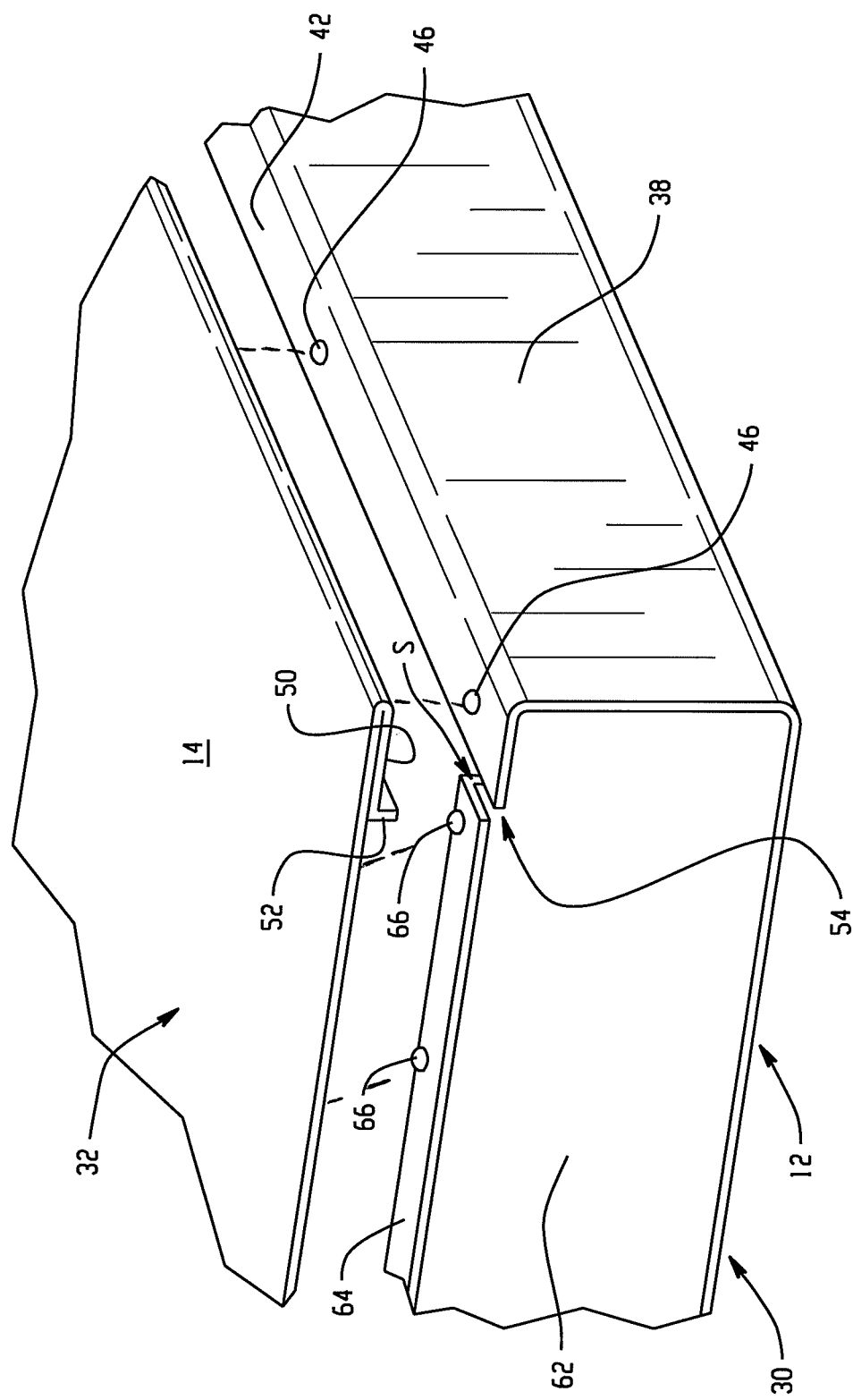
FIG. 6 is an enlarged portion of FIG. 5.
Figure 7:
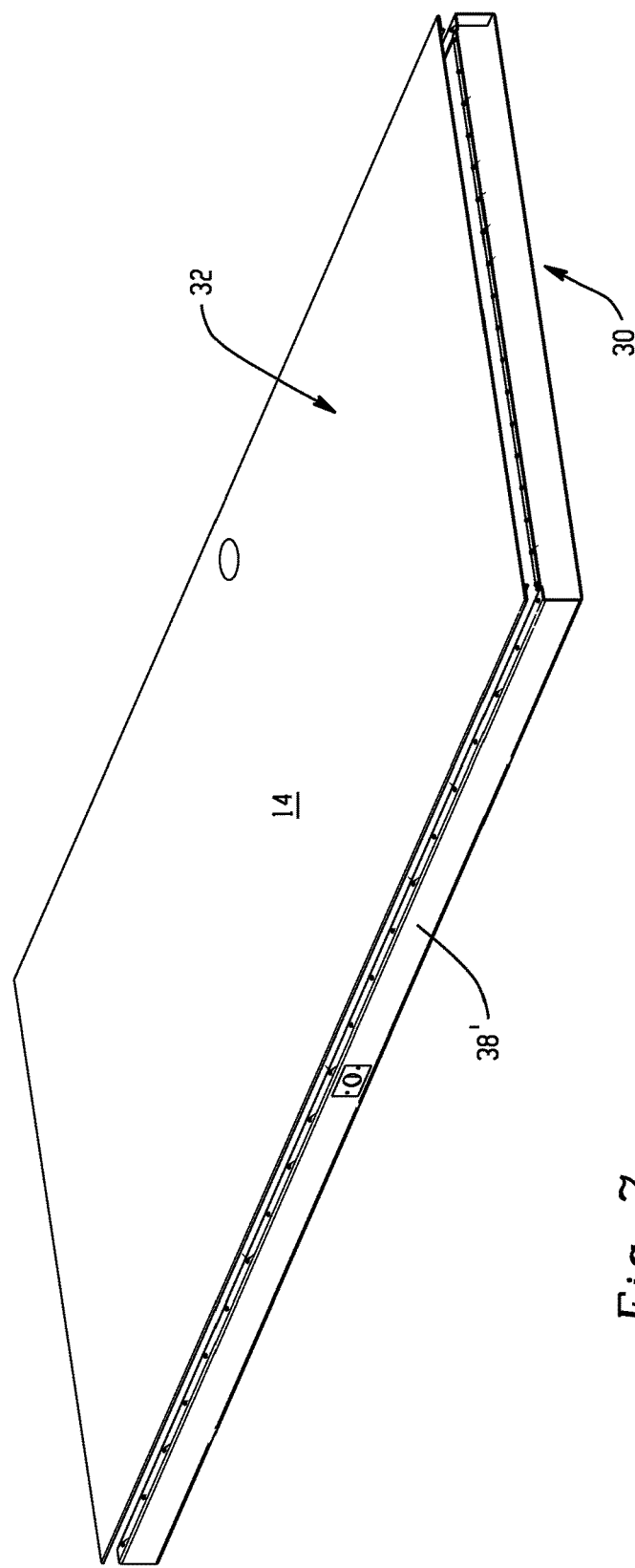
FIG. 7 is another perspective view of the door of FIG. 1 in a partially assembled state.
Figure 8:
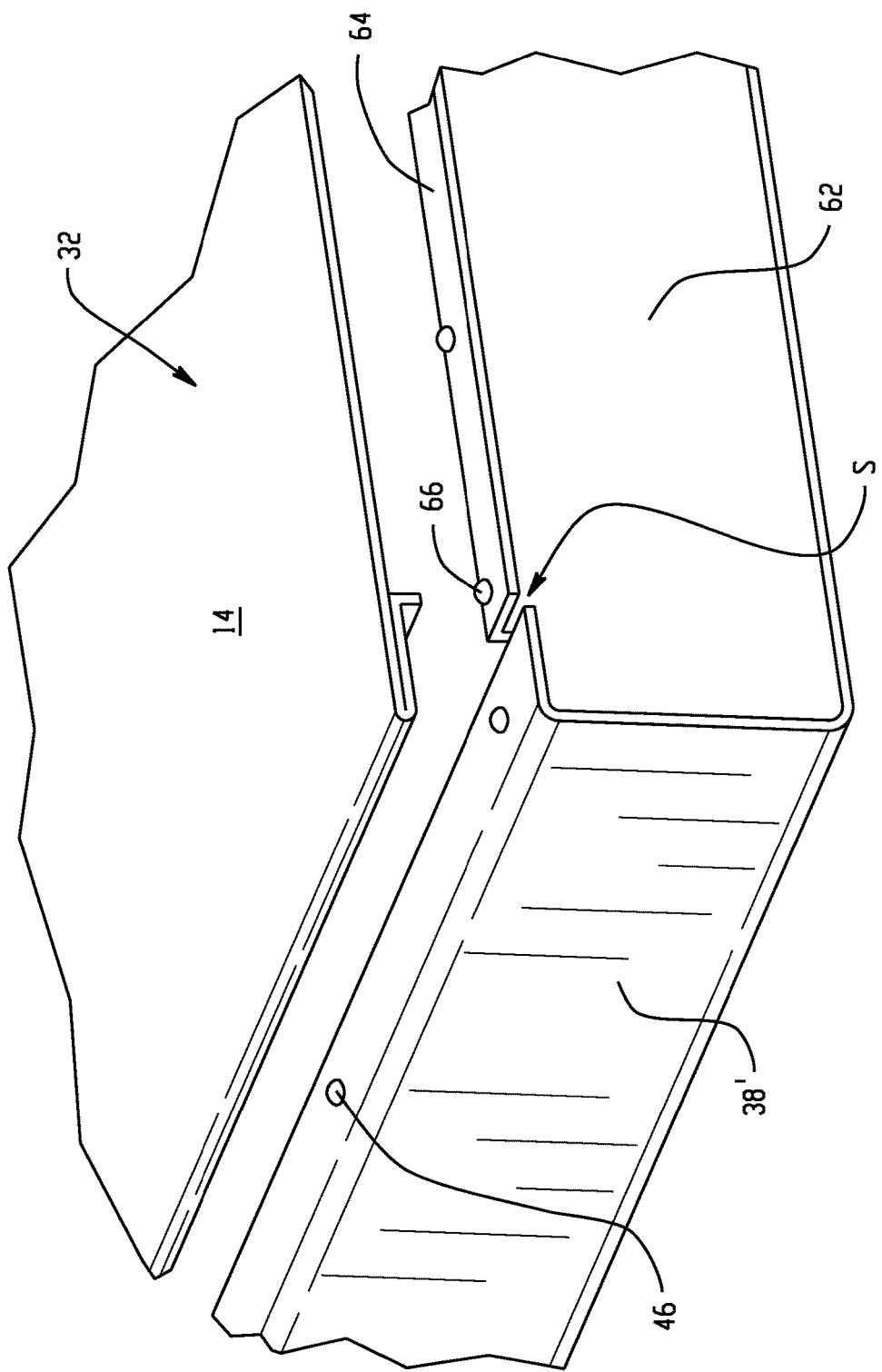
FIG. 8 is an enlarged portion of FIG. 7.

As best seen in FIG. 6, flange 38 has a general c-shape cross-section having two respective 90 degree angles. It will be appreciated that in some embodiments, the vertical portion of the c-shape cross-section can be angled to provide a beveled door edge. As such, the term c-shape cross-section is exemplary and not intended to limit the flange to a specific shape. For example, flange 38', as best seen in FIGS. 7 and 8, has a slightly angled side such that the side edge of the finished door is beveled.

The lid 32 includes a top surface forming the back face 14 of the door 10. Opposite edges of the top surface each have a hem 50 configured to mate with a respective lid engaging surface 42 of each flange 38 and 38'. In the illustrated embodiment, the hem 50 includes a portion of the top surface folded back on itself. The width of each hem 50 generally corresponds to the width of the lid engaging surface 42 with which it is intended to mate, although it should be appreciated that other configurations are also possible and that each respective lid engaging surface/hem pair can have different dimensions depending on the specific application.

Each hem 50 further includes a downturned lip 52 at a distal end thereof. The downturned lip 52 is configured to engage an end face 54 of the lid engaging surface 42. It will be appreciated that the lips 52 are positioned so as to interlock the lid 32 with the pan 30 to restrict lateral movement therebetween. The lips 52 also restrict the flanges 38 and 38' from inward rotation (e.g., towards the interior of the door assembly) and/or or deformation during assembly and/or welding operations. The lips 52 can also aid in assembly by assisting in locating the pan relative to the lid during placement. Alternatively, the rotation-resistance and fit-up assistance may also be accomplished separately or conjunctively by engaging a plurality of embossments formed into the hemmed flange of the lid so as to engage corresponding reliefs in the mating surface of the pan flange.

The top and bottom edges of the door 10 include top and bottom channels 62 fitted between the pan 30 and lid 32. The top and bottom channels each include a flange 64 having a plurality of weld projections 66. Weld projections 66 are configured to weld the channels to the lid, as will be described below.

To assemble the door 10, the pan 30 can be placed on a work surface. Various internal features can be positioned within the pan 30. These features can include the hinge tap plates, lock tap plate, any internal structural members, expanded honeycomb paper, insulation, etc. In addition, the top and bottom channels 62 are positioned within the pan 30.

Once the internal features and top and bottom channels 62 are positioned within the pan 30, the lid 32 is positioned on the pan 30. In general, the top and bottom edges of the lid 32 and pan 30 are aligned. A suitable jig or abutment surface can be used to ensure proper alignment. Meanwhile, the lips 52 of each hem 50 of the lid 32 are positioned to abut the end faces 54 of the lid engaging surfaces 42 of flanges 38. To this end, a slot S is formed between the flange 64 of the channel 62 and the end face 54 of each flange 38 and 38'. The slot S has a width approximately equal to the thickness of the sheet material of the pan such that the lip 52 is closely received therein. By positioning the lips 52 in the slots S, the pan 32, top and bottom channels 62, and lid are loosely interlocked in a suitable position for welding operations.

In one embodiment, a first end/side of the door 10 is clamped in a resistance welding machine. Current is then applied between faces of the door 10. The current flows between the lid 32 and pan 30 via the projections 46 and 66 causing the projections to melt. When the current is removed, the melted projections resolidify thereby welding the pan 30 and the end channel (bottom/top panel) 62 to the lid 32. It will be appreciated that the amount of current and duration of application of the current can vary depending on various factors such as the type and thickness of the material in a given application, the number of weld points to be simultaneously welded, the size of the projections, etc.

Once the first end/side of the door 10 is welded, the other end/side of the door 10 is clamped in the welding machine and the welding process is performed again. It will be appreciated that the door of the present disclosure can be welded in a single weld operation, if desired. Alternatively, the top and bottom channels 62 may be first welded to the pan between the flanges 64 and the inside surfaces of pan 30 and then welded to the lid 32 as described above.

By spacing the projections 46 and 66 approximately four inches apart, the perimeter of the door is fully welded resulting in a robust door construction that resists racking.

Of course, other weld spacings can be employed depending on the particular application and the present disclosure is not limited to any particular weld spacing. It should, therefore, be appreciated that the finished door 10 can be a fully-welded pan-and-lid design door.

It should further be appreciated that, unlike prior art welded doors, any weld marks of the present exemplary door are hidden by the hem 50 along the side edges of the lid 32. That is, the welds extend between the lid engaging surfaces 42 of the pan 30 and the hems 50 such that any weld marks are on the interior surface of the lid and/or pan. Accordingly, post-welding treatment of the door to remove or repair welding marks is generally not needed.

Although the exemplary embodiment includes projections on the pan, it should be appreciated that projections can be provided on the lid as well. For example, projections can be provided on the underturned portion of the lid forming the hems. In some embodiments, projections can be provided on both the lid and the pan.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A welded steel door comprising:
   a pan including a bottom surface forming a first face of the door and flanges extending on opposite edges thereof forming opposite side edges of the door, the flanges having a lid engaging surface spaced from the bottom surface;
   a lid having a top surface forming a second face of the door opposite the first face, opposite edges of the top surface each having a hem mated with a respective lid engaging surface of each flange, the hem including a portion of the top surface folded back on itself; and
   a plurality of projection spot welds securing the lid to the pan, the projection spot welds spaced along each hem, the welds extending between the portion of the top surface of the lid folded back on itself of each hem and the respective lid engaging surface of each flange.

2. The welded steel door of claim 1, wherein at least one flange is c-shape in cross-section.

3. The welded steel door of claim 1, wherein the lid engaging surface is generally parallel to the bottom surface of the pan.

4. The welded steel door of claim 1, wherein at least one of the hems further comprises a downturned lip at a distal end of the portion of the top surface folded back on itself.

5. The welded steel door of claim 4, wherein a width of at least one hem and its corresponding lid engaging surface are coextensive, and wherein the lip engages an end face of the lid engaging surface, whereby the flange is restricted from inward rotation by the lip.

6. The welded steel door of claim 1, wherein at least one hem and its corresponding lid engaging surface extend completely along a length of the door.

7. The welded steel door of claim 1, wherein the projection spot welds space the lid from the lid engaging surface.

8. The welded steel door of claim 1, further comprising a top and bottom channel welded to the pan and lid.

9. The welded steel door of claim 1, wherein each of the plurality of projection spot welds extend only between the portion of the top surface folded back on itself of each hem and the respective lid engaging surface of each flange, whereby the welds are concealed behind the top surface of the pan.

10. The welded steel door of claim 1, wherein the plurality of projection spot welds do not extend between the hem and the top surface of the lid.

11. The welded steel door of claim 1, wherein the second face of the door is weld-free.

12. The welded steel door of claim 1, wherein the plurality of projection spot welds comprise melted and resolidified projections between the pan and the lid.

\* \* \* \* \*